United States Patent
Purushothaman

(10) Patent No.: US 10,310,959 B2
(45) Date of Patent: Jun. 4, 2019

(54) PRE-DEPLOYMENT VALIDATION SYSTEM USING INTELLIGENT DATABASES

(71) Applicant: Bank of America Corporation, Charlotte, NC (US)

(72) Inventor: Venugopal Purushothaman, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/805,535

(22) Filed: Nov. 7, 2017

(65) Prior Publication Data

US 2019/0138427 A1 May 9, 2019

(51) Int. Cl.
*G06F 9/44* (2018.01)
*G06F 11/36* (2006.01)
*G06F 11/07* (2006.01)

(52) U.S. Cl.
CPC ...... *G06F 11/3612* (2013.01); *G06F 11/3684* (2013.01); *G06F 11/3688* (2013.01);
(Continued)

(58) Field of Classification Search
CPC ............. G06F 11/3664; G06F 11/3604; G06F 11/3672; G06F 11/3676; G06F 11/34;
(Continued)

(56) References Cited

U.S. PATENT DOCUMENTS 6,502,102 B1 * 12/2002 Haswell .............. G06F 11/3664
6,550,024 B1 * 4/2003 Pagurek .............. G06F 11/0709
714/47.2

(Continued)

OTHER PUBLICATIONS

Kevin S. Beyer et al., Jaql: A Scripting Language for Large Scale Semistructured Data Analysis , 2011, [Retrieved on Feb. 25, 2019]. Retrieved from the internet: <URL: http://www.vldb.org/pvldb/vol4/p1272-beyer.pdf?> 12 Pages (1272-1283) (Year: 2011).*

(Continued)

*Primary Examiner* — Anibal Rivera
(74) *Attorney, Agent, or Firm* — Banner & Witcoff, Ltd.; Michael A. Springs

(57) ABSTRACT

A computing platform may receive a primary model corresponding to one or more features of an application. The computing platform may populate, using a processing engine and based on the primary model, a secondary model indicating an object definition corresponding to the one or more features. The computing platform may generate, using a pre-deployment engine and based on the primary model, a script corresponding to the one or more features. The computing platform may generate one or more commands directing a production server to execute, in a production environment, the script corresponding to the one or more features. The computing platform may transmit, to the production server and via the communication interface, the one or more commands directing the production server to execute the script. The computing platform may receive, based on the one or more commands, an error corresponding to the one or more features.

20 Claims, 11 Drawing Sheets

(52) U.S. Cl.
CPC ...... *G06F 11/3692* (2013.01); *G06F 11/0709* (2013.01); *G06F 11/3604* (2013.01); *G06F 11/3664* (2013.01); *G06F 11/3672* (2013.01); *G06F 11/3676* (2013.01)

(58) Field of Classification Search
CPC .......... G06F 11/0709; G06F 8/70; G06F 8/71; G06F 8/34; G06F 8/00; G06F 8/10; G06F 8/38; G06F 8/20; G06F 8/72; G06F 8/36; G06F 8/65; G06F 17/30; G06F 9/455
See application file for complete search history.

(56) References Cited

U.S. PATENT DOCUMENTS

| | | | |
|---|---|---|---|
| 7,219,339 B1 * | 5/2007 | Goyal | H04L 41/085 717/141 |
| 7,549,144 B2 | 6/2009 | Jubran | |
| 8,291,378 B2 | 10/2012 | Arnold et al. | |
| 8,505,005 B1 | 8/2013 | Bos et al. | |
| 8,572,566 B2 * | 10/2013 | Gass | G06F 8/71 717/101 |
| 9,098,632 B2 * | 8/2015 | Cook | G06F 8/38 |
| 9,176,730 B2 * | 11/2015 | Weissman | G06F 8/70 |
| 9,280,445 B2 | 3/2016 | Carson et al. | |
| 9,430,505 B2 | 8/2016 | Padmanabhan et al. | |
| 9,619,363 B1 | 4/2017 | Chitale et al. | |
| 9,619,371 B2 | 4/2017 | Kdderly et al. | |
| 9,672,139 B2 * | 6/2017 | Peng | G06F 11/3664 |
| 9,692,653 B1 | 6/2017 | Baset et al. | |
| 9,727,407 B2 | 8/2017 | Ruan et al. | |
| 9,971,573 B2 * | 5/2018 | Adar | G06F 8/36 |
| 2003/0188291 A1 * | 10/2003 | Fisher | G06F 8/20 717/102 |
| 2004/0044993 A1 * | 3/2004 | Muller | G06F 11/3664 717/124 |
| 2008/0028364 A1 * | 1/2008 | Triou | G06F 11/3676 717/104 |
| 2010/0131857 A1 * | 5/2010 | Prigge | G06F 8/10 715/744 |
| 2011/0282995 A1 * | 11/2011 | Gass | G06F 8/65 709/226 |
| 2011/0283269 A1 * | 11/2011 | Gass | G06F 8/65 717/168 |
| 2011/0283270 A1 * | 11/2011 | Gass | G06F 8/65 717/168 |
| 2011/0296391 A1 * | 12/2011 | Gass | G06F 8/36 717/168 |
| 2012/0060144 A1 * | 3/2012 | Novak | G06Q 10/06 717/105 |
| 2012/0144373 A1 * | 6/2012 | Cook | G06F 8/38 717/125 |
| 2012/0290940 A1 * | 11/2012 | Quine | G06F 8/34 715/744 |
| 2012/0290955 A1 * | 11/2012 | Quine | G06F 8/34 715/763 |
| 2012/0290959 A1 * | 11/2012 | Quine | G06F 8/34 715/765 |
| 2012/0291005 A1 * | 11/2012 | Quine | G06F 8/00 717/105 |
| 2012/0291006 A1 * | 11/2012 | Quine | G06F 8/00 717/105 |
| 2015/0363292 A1 * | 12/2015 | Shiraishi | G06F 11/3604 717/125 |
| 2016/0371176 A1 * | 12/2016 | Adar | G06F 8/36 |
| 2017/0024307 A1 * | 1/2017 | Peng | G06F 11/3664 |
| 2017/0244613 A1 | 8/2017 | Vasudevan et al. | |
| 2017/0244894 A1 | 8/2017 | Aggarwal et al. | |
| 2017/0244984 A1 | 8/2017 | Aggarwal et al. | |
| 2017/0244991 A1 | 8/2017 | Aggarwal et al. | |
| 2017/0248871 A1 | 8/2017 | Iwatsuki et al. | |
| 2017/0249420 A1 | 8/2017 | Saladi et al. | |
| 2017/0250868 A1 | 8/2017 | Keeney et al. | |
| 2017/0250932 A1 | 8/2017 | Tee et al. | |
| 2017/0255188 A1 | 9/2017 | Izikson et al. | |
| 2017/0255826 A1 | 9/2017 | Chang et al. | |
| 2017/0255827 A1 | 9/2017 | Chang et al. | |
| 2017/0255828 A1 | 9/2017 | Chang et al. | |
| 2017/0255829 A1 | 9/2017 | Chang et al. | |
| 2017/0257356 A1 | 9/2017 | Hankins et al. | |
| 2017/0257474 A1 | 9/2017 | Rhoads et al. | |
| 2017/0257724 A1 | 9/2017 | Bosnjak et al. | |
| 2017/0261645 A1 | 9/2017 | Kleeman et al. | |
| 2017/0262539 A1 | 9/2017 | Andreasen et al. | |
| 2017/0266261 A1 | 9/2017 | Rosa | |
| 2017/0266548 A1 | 9/2017 | Perlman | |
| 2017/0268055 A1 | 9/2017 | Stava et al. | |
| 2017/0271984 A1 | 9/2017 | Kohn et al. | |
| 2017/0272316 A1 | 9/2017 | Johnson et al. | |
| 2017/0277521 A1 | 9/2017 | Sharma et al. | |
| 2017/0277701 A1 | 9/2017 | Maharajh et al. | |
| 2017/0278000 A1 | 9/2017 | Kohlhepp | |
| 2017/0278171 A1 | 9/2017 | Tapia | |
| 2017/0279928 A1 | 9/2017 | Mokeev et al. | |
| 2017/0279931 A1 | 9/2017 | Schurman et al. | |
| 2017/0279932 A1 | 9/2017 | Schurman et al. | |
| 2017/0279933 A1 | 9/2017 | Schurman et al. | |
| 2017/0285981 A1 | 10/2017 | DeArment | |
| 2017/0285982 A1 | 10/2017 | DeArment | |
| 2017/0286102 A1 | 10/2017 | Prismon et al. | |
| 2017/0286802 A1 | 10/2017 | Mezghani et al. | |
| 2017/0289236 A1 | 10/2017 | Merchant et al. | |
| 2017/0289341 A1 | 10/2017 | Rodriguez et al. | |
| 2017/0293835 A1 | 10/2017 | AlAjmi et al. | |
| 2017/0300598 A1 | 10/2017 | Akavia et al. | |
| 2017/0302521 A1 | 10/2017 | Lui et al. | |
| 2017/0304584 A1 | 10/2017 | Tsai et al. | |
| 2017/0304707 A1 | 10/2017 | Morton et al. | |
| 2017/0308360 A1 | 10/2017 | Kambach et al. | |
| 2017/0308401 A1 | 10/2017 | Argenti et al. | |
| 2017/0308676 A1 | 10/2017 | Daya et al. | |
| 2017/0310552 A1 | 10/2017 | Wallerstein et al. | |
| 2017/0315856 A1 | 11/2017 | Tee et al. | |
| 2017/0317765 A1 | 11/2017 | Morris et al. | |
| 2017/0317767 A1 | 11/2017 | Humphrey et al. | |
| 2017/0318128 A1 | 11/2017 | Ananthanarayanan et al. | |
| 2017/0329700 A1 * | 11/2017 | Alteneder | G06F 11/3672 |

OTHER PUBLICATIONS

Michael Wilde et al., Swift: A language for distributed parallel scripting, 2011, [Retrieved on Feb. 25, 2019]. Retrieved from the internet <URL: https://ac.els-cdn.com/S0167819111000524/1-s2.0-S0167819111000524-main.pdf?> 20 Pages (633-652) (Year: 2011).*

* cited by examiner

Secondary Model

| OBJECT_TYPE | OBJECT_NAME | KEY | VALUE |
|---|---|---|---|
| SEQUENCE | SEQ_1 | MINVALUE | 1 |
| SEQUENCE | SEQ_1 | MAXVALUE | 99999 |
| SEQUENCE | SEQ_1 | START WITH | 10 |
| SEQUENCE | SEQ_1 | GRANT | SELECT ON X.TABLE |
| SEQUENCE | SEQ_1 | SCHEMA | X |
| TYPE | VARCHAR2_ARRAY | SCHEMA | X |
| TYPE | VARCHAR2_ARRAY | Object/Collection | CollectionType |
| TYPE | VARCHAR2_ARRAY | BODY | NULL |
| TABLE | EMPLOYEE_TBL | COL1 | AGE/NUMBER(10) |
| TABLE | EMPLOYEE_TBL | COL2 | NAME/VARCHAR2(100) |
| TABLE | EMPLOYEE_TBL | PK | EID/NUMBER |
| TABLE | EMPLOYEE_TBL | USED_BY | PKG1/PKG2/PKG3 |

310

Primary Model

- constraints
- functions
- grants
- indexes
- materialized_views
- packages
- procedures
- roles
- sequences
- synonyms
- tables
- triggers
- types
- views

Error Report

| S.No | Objects | Object Type | Status | Code Snippet | Error Details | Root Cause / Comments |
|---|---|---|---|---|---|---|
| 1 | TEST_PKG | Package | | lv_ADDRESS test_tab.ADDRESS%TYPE; | Line # 6, PLS-00302: component 'ADDRESS' must be declared | Table : Missing "ADDRESS" field/column in table TEST_TAB |
| 2 | MS_ISM_USER_PKG | Package | | NA | Dependent object is invalid | "MS_ISM_USER_PKG" package is invalid due to referring "TEST_PKG" package which is invalid state. Fixing "TEST_PKG" will resolve this issue |
| 3 | MS_ISM_EMP_UTILS | Package | | NA | NA | NA |
| 4 | PROCESS_SALARY | Procedure | | NA | NA | NA |
| 5 | GET_SALARY | Function | | NA | NA | NA |

FIG. 5

PRE-DEPLOYMENT VALIDATION SYSTEM USING INTELLIGENT DATABASES

BACKGROUND

Aspects of the disclosure relate to data processing, software development, and software program development tools and techniques including processes and apparatuses for controlling data processing operations pertaining to the development, maintenance, and installation of software programs. In particular, one or more aspects of the disclosure relate to software development tools that utilize intelligent databases in a pre-deployment validation system.

For various reasons, enterprise organizations may need to increasingly update and add new features to both internal-facing and external-facing software applications. For example, a programmer may create an update for a particular application, which may include code implementing a new feature. However, testing the new feature in a lab environment may be different from implementing the new feature in a production environment. For instance, an object may compile and run smoothly during the testing phase. But, when the object is deployed into the production environment, the object may be missing certain attributes that may cause the application to crash. As such, a technical solution may be needed for and useful in preventing downtime of an enterprise software application when new features are being introduced.

SUMMARY

Aspects of the disclosure provide effective, efficient, scalable, and convenient technical solutions that address and overcome the technical problems associated with pre-deployment validation of new features and/or updates for enterprise software applications.

In accordance with one or more embodiments, a computing platform having at least one processor, a memory, and a communication interface may receive, via the communication interface and from a user device, a primary model corresponding to one or more features of an application. Thereafter, the computing platform may populate, using a processing engine and based on the primary model, a secondary model indicating an object definition corresponding to the one or more features. Then, the computing platform may generate, using a pre-deployment engine and based on the primary model, a script corresponding to the one or more features. Subsequently, the computing platform may generate one or more commands directing a production server to execute, in a production environment, the script corresponding to the one or more features. Next, the computing platform may transmit, to the production server and via the communication interface, the one or more commands directing the production server to execute the script. Then, the computing platform may receive, via the communication interface, from the production server, and based on the one or more commands, an error corresponding to the one or more features. Afterwards, the computing platform may generate, based on comparing the error with the secondary model, an error report. Subsequently, the computing platform may transmit, to the user device, the error report.

In some embodiments, the computing platform may receive the primary model corresponding to the one or more features of the application by receiving, from the user device, a code base corresponding to the one or more features. Subsequently, the computing platform may sort, based on an object type, a plurality of objects corresponding to the one or more features. After, the computing platform may generate, based on the sorting of the plurality of objects, the primary model.

In some embodiments, the computing platform may populate the secondary model indicating the object definition by retrieving, from the primary model, an object corresponding to the one or more features. Afterwards, the computing platform may determine, based on the object, the object definition. Next, the computing platform may generate, based on the object definition, the secondary model. In some instances, the object definition may comprise an object type, an object name, and an object value.

In some embodiments, the computing platform may generate the script corresponding to the one or more features by determining, based on the primary model, a package of code corresponding to the one or more features. Subsequently, the computing platform may generate, based on the package of code, the script, wherein the script comprises a function corresponding to the package of code. In some examples, the script may further comprise a null statement. Further, the null statement may block the package of code from being executed in the production environment. In some instances, the production environment may be an environment that provides the application to a plurality of end users.

In some embodiments, the one or more commands directing the production server to execute the script may comprise commands to execute, in the production environment, the script to determine the error. Additionally, the error may comprise a syntax error or a semantic error. Next, the one or more commands directing the production server to execute the script may comprise commands to report, to the computing platform, the error.

In some embodiments, the secondary model may indicate a future state of the application comprising the one or more features. Then, the computing platform may generate the error report by comparing the error with the secondary model indicating the future state of the application. Subsequently, the computing platform may determine, based on the comparing of the error with the secondary model, whether the error is resolved by the future state of the application.

In some embodiments, the computing platform may receive, via the communication interface and from a second user device, a second primary model corresponding to one or more features of a second application. Thereafter, the computing platform may populate, using the processing engine and based on the second primary model, a second secondary model indicating a second object definition corresponding to the one or more features of the second application. Then, the computing platform may generate, using the pre-deployment engine and based on the second primary model, a second script corresponding to the one or more features of the second application. Subsequently, the computing platform may generate one or more commands directing the production server to execute, in the production environment, the second script corresponding to the one or more features of the second application. Next, the computing platform may transmit, to the production server and via the communication interface, the one or more commands directing the production server to execute the second script. Then, the computing platform may receive, via the communication interface, from the production server, and based on the one or more commands, a second error corresponding to the one or more features of the second application. Afterwards, the computing platform may generate, based on comparing the second error with the second secondary model, a second error report. Subsequently, the computing platform may transmit, to the user device, the second error report.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts example models for pre-deployment validation using intelligent databases in accordance with one or more example embodiments;

FIG. 5 depicts an example graphical user interface for pre-deployment validation using intelligent databases in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
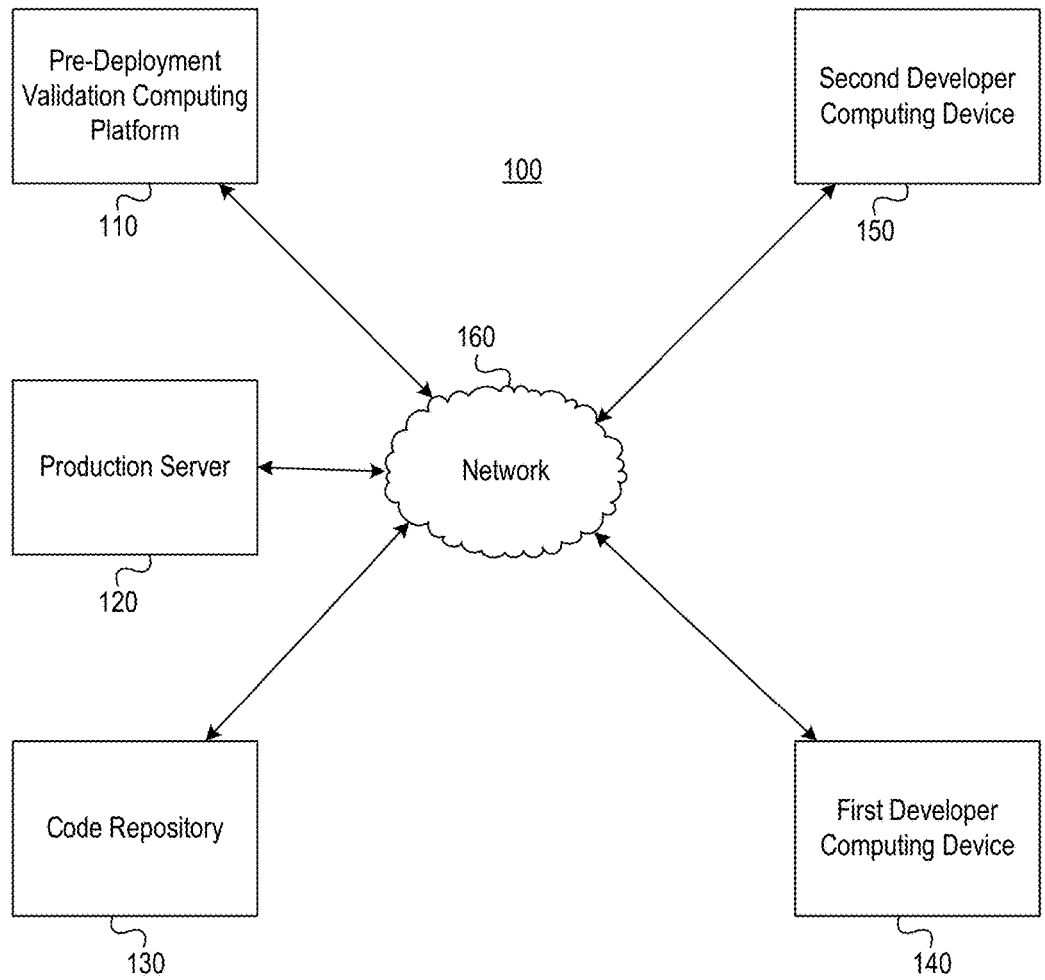
FIGS. 1A and 1B depict an illustrative computing environment for pre-deployment validation using intelligent databases in accordance with one or more example embodiments.
Figure 1B:
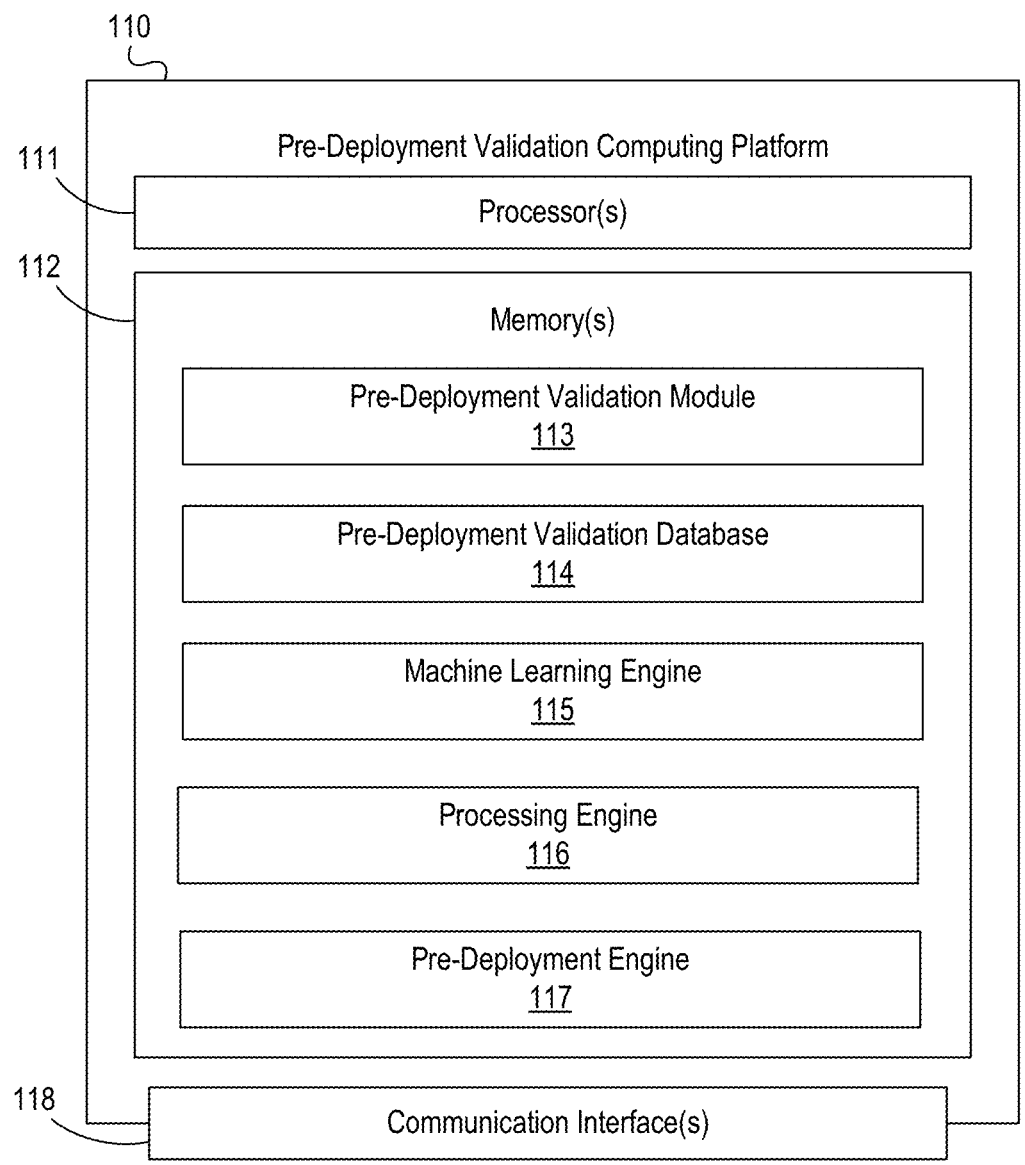

FIGS. 1A and 1B depict an illustrative computing environment for pre-deployment validation using intelligent databases in accordance with one or more example embodiments. Referring to FIG. 1A, computing environment 100 may include one or more computing devices and/or other computer systems. For example, computing environment 100 may include a pre-deployment validation computing platform 110, a production server 120, a code repository 130, a first developer computing device 140, and a second developer computing device 150.

The pre-deployment validation computing platform 110 may be configured to determine errors prior to deployment of an update for an application by controlling and/or directing actions of other devices and/or computer systems and/or may be configured to perform other functions, as discussed in greater detail below. In some instances, the pre-deployment validation computing platform 110 may perform and/or provide one or more techniques to determine errors prior to deployment of one or more features and/or updates for an application.

The production server 120 may be configured to store, maintain, deploy, and/or execute code for the application. For example, the production server 120 may be configured to deploy and/or execute the application in a production environment, such as an environment where end users may use the application. In some instances, the production server 120 might not be another entity, but the functionalities of the production server 120 may be included within the pre-deployment validation computing platform 110.

The code repository 130 may be configured to receive, store, and/or maintain code for one or more applications for the enterprise organization. For example, the code repository 130 may be configured to receive and/or store software program code, such as programming code corresponding to a new feature and/or update of the application. In some examples, the code repository 130 may store code for the entire application. For example, the code repository 130 may store backup code for the entire application. In some embodiments, the code repository 130 may run and/or execute code in a test environment. For example, a developer of the new feature may test code prior to deploying the code in the production environment. The code repository 130 may receive, store, and/or execute the code in a test environment to determine errors. In some instances, the code repository 130 might not be another entity, but the functionalities of the code repository 130 may be included within the pre-deployment validation computing platform 110.

The first developer computing device 140 may be configured to be used by one or more users of computing environment 100. For example, the first developer computing device 140 may be configured to provide one or more user interfaces that enable the one or more users and/or developers to create new features and/or updates for the application. The first developer computing device 140 may receive, from the one or more users or developers, user input or selections and send the user input or selections to the code repository 130 and/or one or more other computer systems and/or devices in computing environment 100. The first developer computing device 140 may receive, from the pre-deployment validation computing platform 110 and/or one or more other computer systems and/or devices in computing environment 100, information or data in response to the user input or selection. For example, the first developer computing device 140 may receive one or more generated reports indicating errors, such as semantic and/or syntax errors, for the new feature and/or update. Additionally, and/or alternatively, after receiving the generated reports, the first developer computing device 140 may receive user input indicating a fix to one or more errors corresponding to the generated report.

The second developer computing device 150 may be configured to be used by one or more users of computing environment 100. For example, the second developer computing device 150 may be configured to provide one or more user interfaces that enable the one or more users and/or developers to create new features and/or updates for the application. The second developer computing device 150 may receive, from the one or more users or developers, user input or selections and send the user input or selections to the code repository 130 and/or one or more other computer systems and/or devices in computing environment 100. The second developer computing device 150 may receive, from the pre-deployment validation computing platform 110 and/or one or more other computer systems and/or devices in computing environment 100, information or data in response to the user input or selection. For example, the second developer computing device 150 may receive one or more generated reports indicating errors, such as semantic and/or syntax errors, for the new feature and/or update. Additionally, and/or alternatively, after receiving the generated reports, the first developer computing device 140 may receive user input indicating a fix to one or more errors corresponding to the generated report.

In one or more arrangements, the production server 120, the code repository 130, the first developer computing device 140, and the second developer computing device 150 may be any type of computing device capable of providing a user interface, receiving input via the user interface, and communicating the received input to one or more other computing devices. For example, the production server 120, the code repository 130, the first developer computing device 140, and the second developer computing device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the production server 120, the code repository 130, the first developer computing device 140, and the second developer computing device 150 may, in some instances, be special-purpose computing devices configured to perform specific functions.

Computing environment 100 also may include one or more computing platforms. For example, as noted above, computing environment 100 may include a pre-deployment validation computing platform 110. As illustrated in greater detail below, the pre-deployment validation computing platform 110 may include one or more computing devices configured to perform one or more of the functions described herein. For example, the pre-deployment validation computing platform 110 may include one or more computers (e.g., laptop computers, desktop computers, servers, server blades, or the like).

Computing environment 100 also may include one or more networks, which may interconnect one or more of the pre-deployment validation computing platform 110, the production server 120, the code repository 130, the first developer computing device 140, and the second developer computing device 150. For example, computing environment 100 may include network 160. Network 160 may include one or more sub-networks (e.g., local area networks (LANs), wide area networks (WANs), or the like). For example, network 160 may include a private sub-network that may be associated with a particular organization (e.g., a corporation, financial institution, educational institution, governmental institution, or the like) and that may interconnect one or more computing devices associated with the organization. For example, the pre-deployment validation computing platform 110, the production server 120, the code repository 130, the first developer computing device 140, and the second developer computing device 150 may be associated with an enterprise organization, and a private sub-network included in network 160 and associated with and/or operated by the organization may include one or more networks (e.g., LANs, WANs, virtual private networks (VPNs), or the like) that interconnect the pre-deployment validation computing platform 110, the production server 120, the code repository 130, the first developer computing device 140, and the second developer computing device 150. Network 160 also may include a public sub-network that may connect the private sub-network and/or one or more computing devices connected thereto (e.g., the pre-deployment validation computing platform 110, the production server 120, the code repository 130, the first developer computing device 140, and the second developer computing device 150) with one or more networks and/or computing devices that are not associated with the organization.

Referring to FIG. 1B, the pre-deployment validation computing platform 110 may include one or more processors 111, memory 112, and communication interface 118. A data bus may interconnect processor(s) 111, memory 112, and communication interface 118. Communication interface 118 may be a network interface configured to support communication between pre-deployment validation computing platform 110 and one or more networks (e.g., network 160). Memory 112 may include one or more program modules having instructions that when executed by processor(s) 111 cause the pre-deployment validation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the pre-deployment validation computing platform 110 and/or by different computing devices that may form and/or otherwise make up the pre-deployment validation computing platform 110. For example, memory 112 may have, store, and/or include a pre-deployment validation module 113, a pre-deployment validation database 114, a machine learning engine 115, a process engine 116, and/or a pre-deployment engine 117. The pre-deployment validation module 113 may have instructions that direct and/or cause the pre-deployment validation computing platform 110 to determine errors in new features of an application, as discussed in greater detail below. The pre-deployment validation database 114 may store information used by the pre-deployment validation module 113 and/or the pre-deployment validation computing platform 110 to determine errors in new features of an application and/or in performing other functions. Machine learning engine 115 may have instructions that direct and/or cause the pre-deployment validation computing platform 110 to set, define, and/or iteratively redefine optimization rules, techniques and/or other parameters used by the pre-deployment validation computing platform 110 and/or other systems in computing environment 100.

Processing engine 116 may process code used by the pre-deployment validation computing platform 110. For example, after receiving the code for the new feature, the processing engine 116 may sort the code based on object type. Then, the processing engine 116 may generate a secondary model comprising object definitions, object dependencies, and/or other metadata as explained in further detail below. In some embodiments, the processing engine 116 may store the secondary model in a database, such as the pre-deployment validation database 114.

The pre-deployment engine 117 may validate objects for the pre-deployment validation computing platform 110. For example, the pre-deployment engine 117 may validate objects in a production environment to determine errors, such as syntax and/or semantic errors. The pre-deployment engine 117 may then compare the errors with the secondary model and generate an error report, which may be explained in further detail below.

Figure 2A:
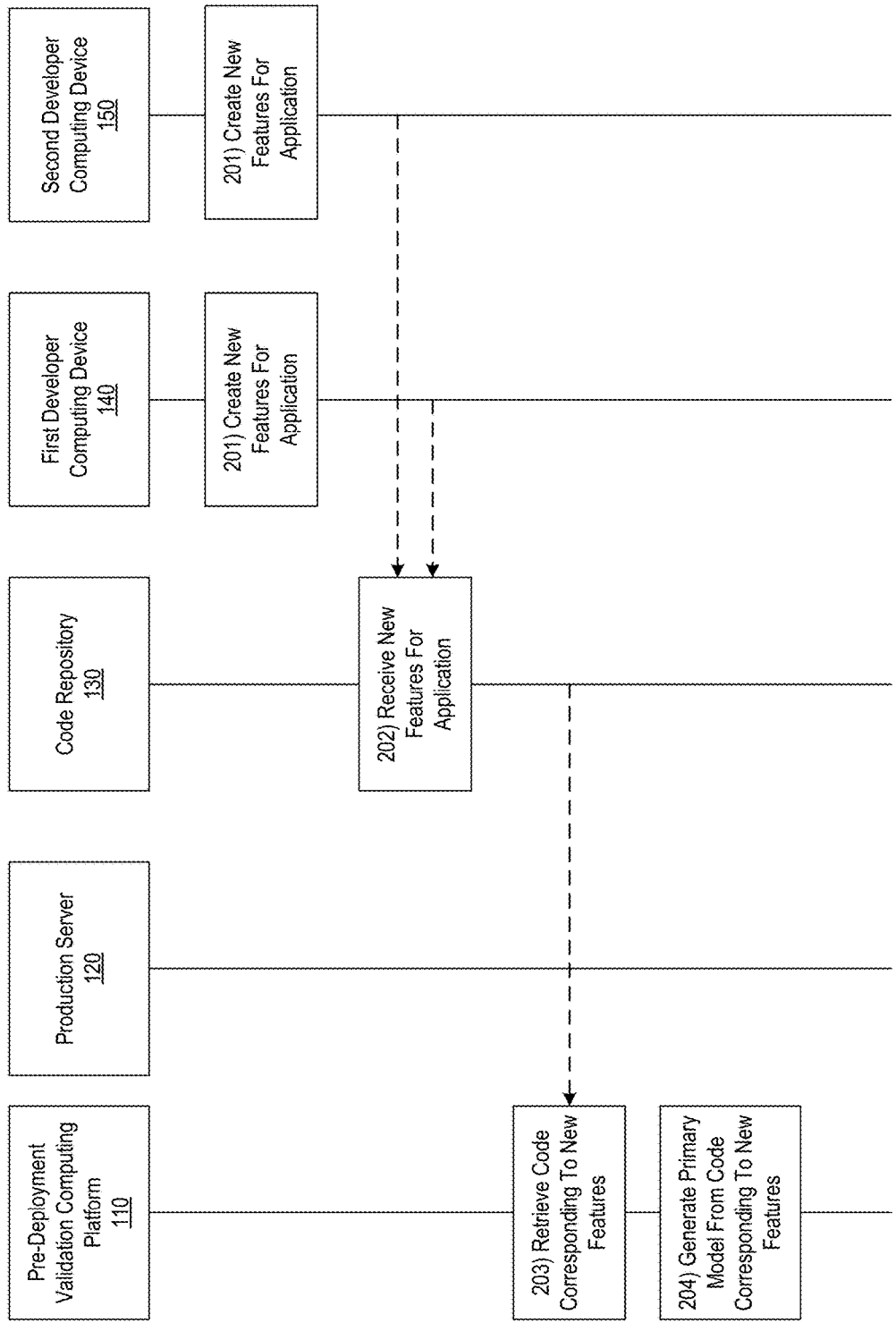
FIGS. 2A, 2B, 2C, 2D, and 2E depict an illustrative event sequence for pre-deployment validation using intelligent databases in accordance with one or more example embodiments.

FIGS. 2A, 2B, 2C, 2D, and 2E depict an illustrative event sequence for pre-deployment validation using intelligent databases in accordance with one or more example embodiments. Referring to FIG. 2A, at step 201, a computing device, such as the first developer computing device 140 and/or the second developer computing device 150, may receive input (e.g., from a software developer) including and/or corresponding to software code defining one or more new features and/or updates for an application. For example, to remain competitive, enterprise organizations may add new features and/or updates to a pre-existing application. The first developer computing device 140 may receive input defining and/or creating new features for the pre-existing application. For example, the first developer computing device 140 may receive input from a user, who may be a developer writing code that creates and/or defines new features for a software application. After writing the code for the new feature and/or update, the developer may test the code. For instance, the first developer computing device 140 may receive a request to determine whether the code comprises errors, such as syntax errors and/or semantic errors. A syntax error may be an error in the code that prevents the code from being compiled. A semantic error might not be an error in the code, but may be an error in the execution of the code, such as an invalid dependent object.

After the first developer computing device 140 receives the new features and/or update for the application, the first developer computing device 140 may transmit the code corresponding to the new features and/or updates to a code repository, such as the code repository 130. For example, the first developer computing device 140 may detect that the code writing process has been completed, may package the code, and may transmit the code to the code repository 130.

Further, a second developer may be working on the same new feature and/or update. The second developer may use a second developer computing device 150 to write code for the new feature and/or update. The second developer computing device 150 may receive input from the second developer defining second code associated with the same new feature and/or update. Then, the second developer computing device 150 may package and transmit the code to the code repository 130.

In some examples, the second developer may be working on a different feature and/or update, and the second developer computing device 150 may receive input defining code associated with the different feature and/or update. The second developer may use the second developer computing device 150 to transmit the different feature and/or update to the code repository 130. Then, as explained in further detail below, the pre-deployment validation computing platform 110 may test the different feature and/or update in a production environment to determine errors corresponding to the different feature and/or update.

In some instances, the second developer may be working on a new feature and/or update for a different application corresponding to the enterprise organization, and the second developer computing device 150 may receive input defining code associated with the different application corresponding to the enterprise organization. The second developer may use the second developer computing device 150 to transmit the new feature and/or update for the different application to the code repository 130. Then, as explained in further detail below, the pre-deployment validation computing platform 110 may test the new feature and/or update for the different application in a production environment to determine errors corresponding to the different feature and/or update.

At step 202, the code repository 130 may receive the new features and/or updates for the application. As mentioned above, the code repository 130 may store the code for the application, including the code for the new feature and/or update. The code repository 130 may be a cloud computing server and/or platform for the enterprise organization. Further, the code repository 130 may receive the code for the new features and/or updates for the application and/or a different application.

In some instances, the developer may wish to determine if there are semantic and/or syntax errors in the new features and/or updates prior to deployment of the new features and/or updates. In such instances, the developer may test the code in a test environment. After transmitting the code to the code repository 130, the code repository 130 may execute the code and determine whether the code compiles in a test environment. Further, the code repository 130 may determine one or more semantic and/or syntax errors for the code corresponding to the new feature and/or update. In some embodiments, the new features and/or updates may compile and run correctly in a test environment, but might not compile and/or run correctly in a production environment (e.g., when the new feature and/or update is deployed in a live version of the application). In some examples, after deploying the new feature and/or update in the live version of the application (e.g., in the production environment), the new feature and/or update may cause the application to crash. This may lead to downtime of the application for a plurality of end users. Thus, a technical solution may be employed to test the new features and/or updates in an isolated portion of the production environment. Errors corresponding to the new features and/or updates may be determined prior to deployment of the application, which may cause less downtime during deployment.

At step 203, the pre-deployment validation computing platform 110 may retrieve the code corresponding to the new features. For example, the pre-deployment validation computing platform 110 may use the processing engine 116 to retrieve, from the code repository 130, the code corresponding to the new features and/or updates for the application. The code may be code corresponding to any programming language, including, but not limited to, JAVA, ORACLE, and/or structured query language (SQL).

In some instances, the pre-deployment validation computing platform 110 may retrieve the code for the new features and/or updates and may also retrieve a portion of additional code corresponding to the application. For instance, the new feature and/or update may update and/or impact one or more pre-existing objects for the application. Thus, the pre-deployment validation computing platform 110 may determine the updated and/or impacted pre-existing objects. Then, the pre-deployment validation computing platform 110 may also retrieve code corresponding to the updated and/or impacted pre-existing objects. As explained in the steps below, the pre-deployment validation computing platform 110 may determine whether the new features and/or updates cause errors in the pre-existing objects.

In some embodiments, the pre-deployment validation computing platform 110 may retrieve the entire code base for the application. For example, the features and/or updates may impact the entire application. Thus, the pre-deployment validation computing platform 110 may retrieve the entire code base for the application.

At step 204, the pre-deployment validation computing platform 110 may generate a primary model from the code corresponding to the new features and/or updates. For example, after retrieving the code corresponding to the new feature and/or retrieving additional code corresponding to the application, the pre-deployment validation computing platform 110 may use the processing engine 116 to generate a primary model from the code for the new features and/or updates and/or additional code. For instance, the code may comprise a plurality of objects, such as a plurality of SQL objects. The pre-deployment validation computing platform 110 may identify and/or sort the code based on object type, such as indexes or tables. Then, the pre-deployment validation computing platform 110 may generate the primary model based on the objects and/or the object types.

FIG. 3 depicts example models for pre-deployment validation using intelligent databases. For example, FIG. 3 shows a primary model 305 and a secondary model 310. As shown in FIG. 3, the primary model 305 may include a plurality of object types. For instance, after the pre-deployment validation computing platform 110 identifies and/or sorts the objects based on object types, the pre-deployment validation computing platform 110 may generate the primary model 305 indicating the plurality of object types. Each object type may include one or more objects corresponding to the new features and/or updates. Further, the primary model 305 may also include objects corresponding to the additional code for the application (e.g., updated and/or impacted objects).

Figure 2B:
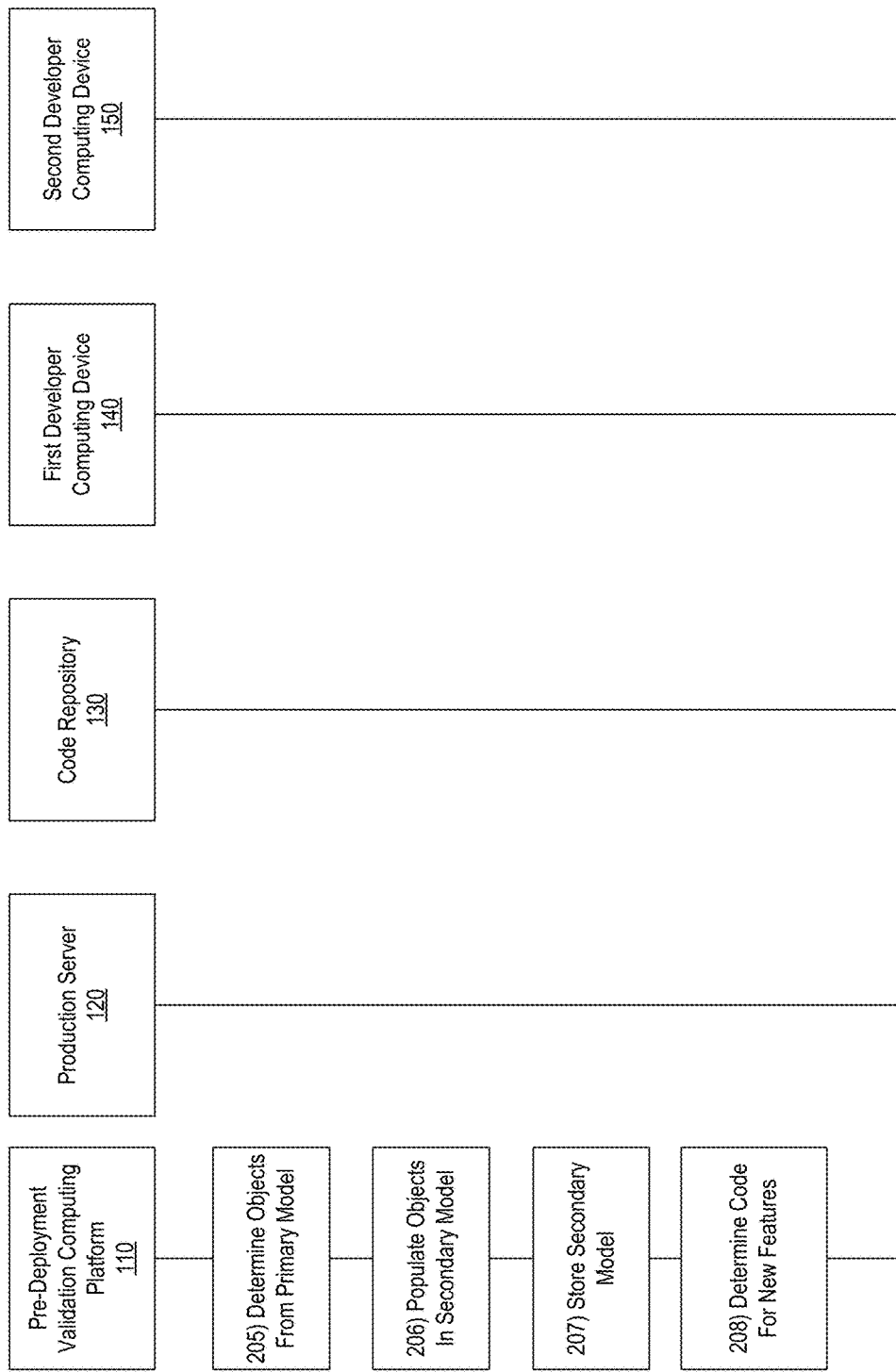

Referring to FIG. 2B, at step 205, the pre-deployment validation computing platform 110 may use the processing engine 116 to determine objects from the primary model. For example, after generating the primary model 305 at step 204, the pre-deployment validation computing platform 110 may process the primary model 305 and determine one or more objects. Referring back to FIG. 3, the pre-deployment validation computing platform 110 may retrieve and/or determine objects from each of the object types in the primary model 305. For example, the pre-deployment validation computing platform 110 may retrieve and/or determine an object from the sequence object type. Additionally, and/or alternatively, the pre-deployment validation computing platform 110 may retrieve and/or determine an object from the tables object type.

At step 206, the pre-deployment validation computing platform 110 may populate the objects in a secondary model 310. For example, after determining objects from the primary model 305, the pre-deployment validation computing platform 110 may use the process engine 116 to populate and/or generate the secondary model 310. Referring back to FIG. 3, the secondary model 310 may include an object type (e.g., sequence, type, and/or table), an object name (e.g., "SEQ_1" and/or "EMPLOYEE_TBL"), a key (e.g., "MINVALUE", "MAXVALUE", "COL1", and/or "COL2"), and/or a value (e.g., "AGE/NUMBER(10)" and/or "NAME/VARCHAR2(100)"). The pre-deployment validation computing platform 110 may retrieve the objects from each of the object types in the primary model 305 to populate and/or generate the secondary model 310.

In some instances, by populating the secondary model, the pre-deployment validation computing platform 110 may determine a future state of the application. For example, the secondary model may indicate a simulation of a post-implementation state of the software application, such as a state where the new features and/or updates have already been implemented in the production environment. For instance, the programming code for the new feature and/or update may define a new column for the employee table, such as a name column. At step 205, the pre-deployment validation computing platform 110 may determine that the primary model 305 includes an object, such as an employee table, corresponding to an object type, such as the table object type. Then, at step 206, the pre-deployment validation computing platform 110 may populate the object, such as the employee table, in the secondary model 310. The secondary model 310 may include the object type (e.g., "TABLE"), the object name (e.g., "EMPLOYEE_TBL"), one or more keys (e.g., "COL1", "COL2", "PK", and "USED_BY"), and/or the value (e.g., "AGE/NUMBER(10)" and/or "NAME/VARCHAR2(100)"). Thus, the secondary model 310 may indicate the new feature and/or update (e.g., the name column) that may be added to a pre-existing object (e.g., employee table). For example, the secondary model 310 may indicate a model and/or simulation of the software application after the new feature and/or update has been implemented in the production environment.

In some embodiments, the pre-deployment validation computing platform 110 may populate the secondary model 310 with object dependencies and/or other metadata information corresponding to the object. For example, referring back to FIG. 3, the secondary model 310 may include a "USED_BY" key field. The "USED_BY" key may indicate a dependent object in the value field. For example, the employee table may be used by a first package, a second package, and a third package (e.g., "PKG1/PKG2/PKG3").

At step 207, the pre-deployment validation computing platform 110 may store the secondary model. For example, after populating and/or generating the secondary model 310, the pre-deployment validation computing platform 110 may use the processing engine 116 to store the secondary model 310. The pre-deployment validation computing platform 110 may store the secondary model in memory, such as the pre-deployment validation database 114. Additionally, and/or alternatively, the pre-deployment validation computing platform 110 may transmit the secondary model 310 to the code repository 130. The code repository 130 may store the secondary model 310.

At step 208, the pre-deployment validation computing platform 110 may determine code for the new features. For example, after retrieving the code corresponding to the new features at step 203, the pre-deployment validation computing platform 110 may use the pre-deployment engine 117 to determine the code for the new features and/or updates. As mentioned previously at step 203, the pre-deployment validation computing platform 110 may retrieve code for the new features and/or updates and may also retrieve portions of additional code for the application. At step 208, the pre-deployment validation computing platform 110 may determine the code for the new features.

In some instances, one or more packages may comprise the code for the new features. For example, when the developer writes code for the new features and/or updates, the computing device, such as the first developer computing device 140 and/or the second developer computing device 150, may create one or more packages for the new features and/or updates based on input received by the first developer computing device 140 and/or the second developer computing device 150 corresponding to the code defining the new features and/or updates written by the developer. Thus, at step 208, the pre-deployment validation computing platform 110 may determine the one or more packages for the new features and/or updates.

Figure 4:
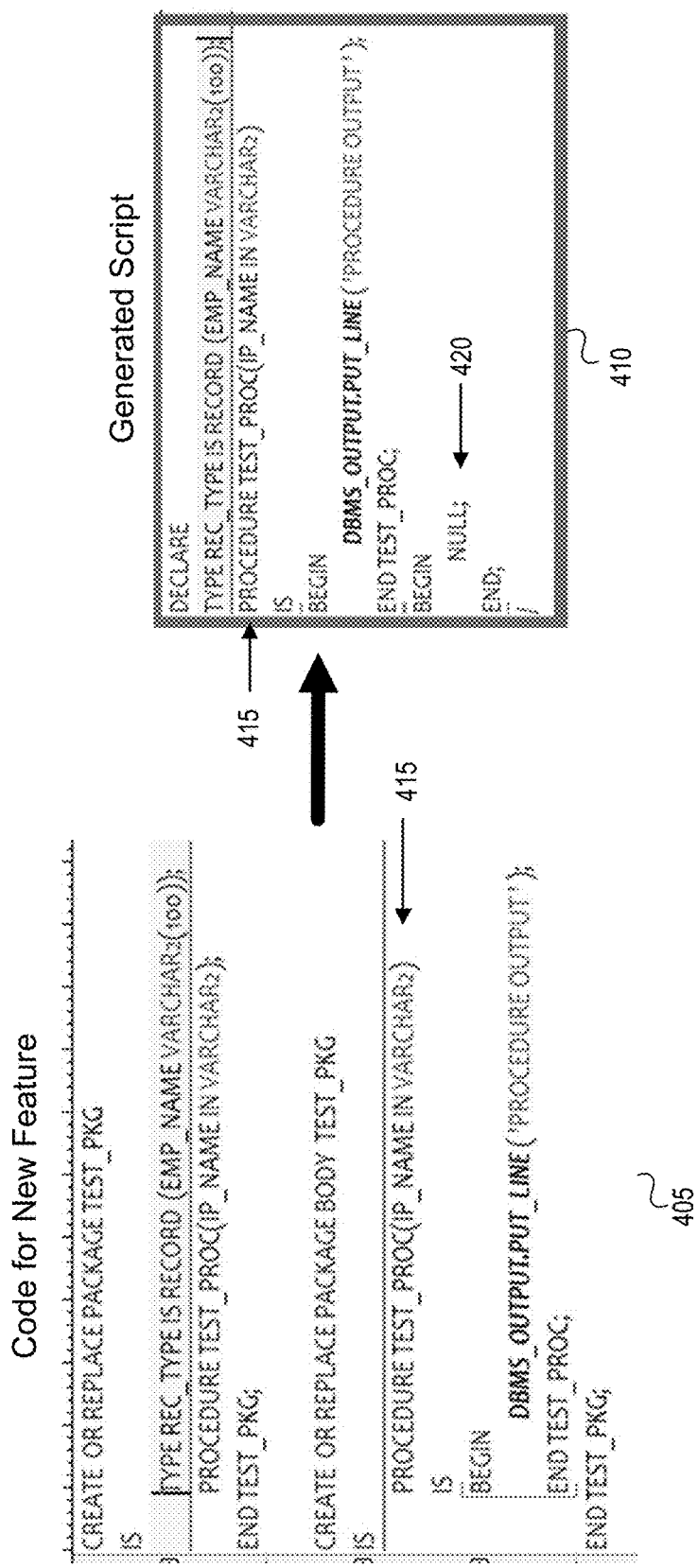
FIG. 4 depicts example programming code for pre-deployment validation using intelligent databases in accordance with one or more example embodiments.

FIG. 4 depicts example programming code for pre-deployment validation using intelligent databases. For example, the pre-deployment validation computing platform 110 may retrieve the code for the new feature 405. As shown in FIG. 4, the code for the new feature 405 may indicate a create or replace package command. Further, the code may indicate a name for the package, such as "TEST_PKG." As explained in further detail below, the pre-deployment validation computing platform 110 may use the code for the new feature 405 to generate a script 410.

Figure 2C:
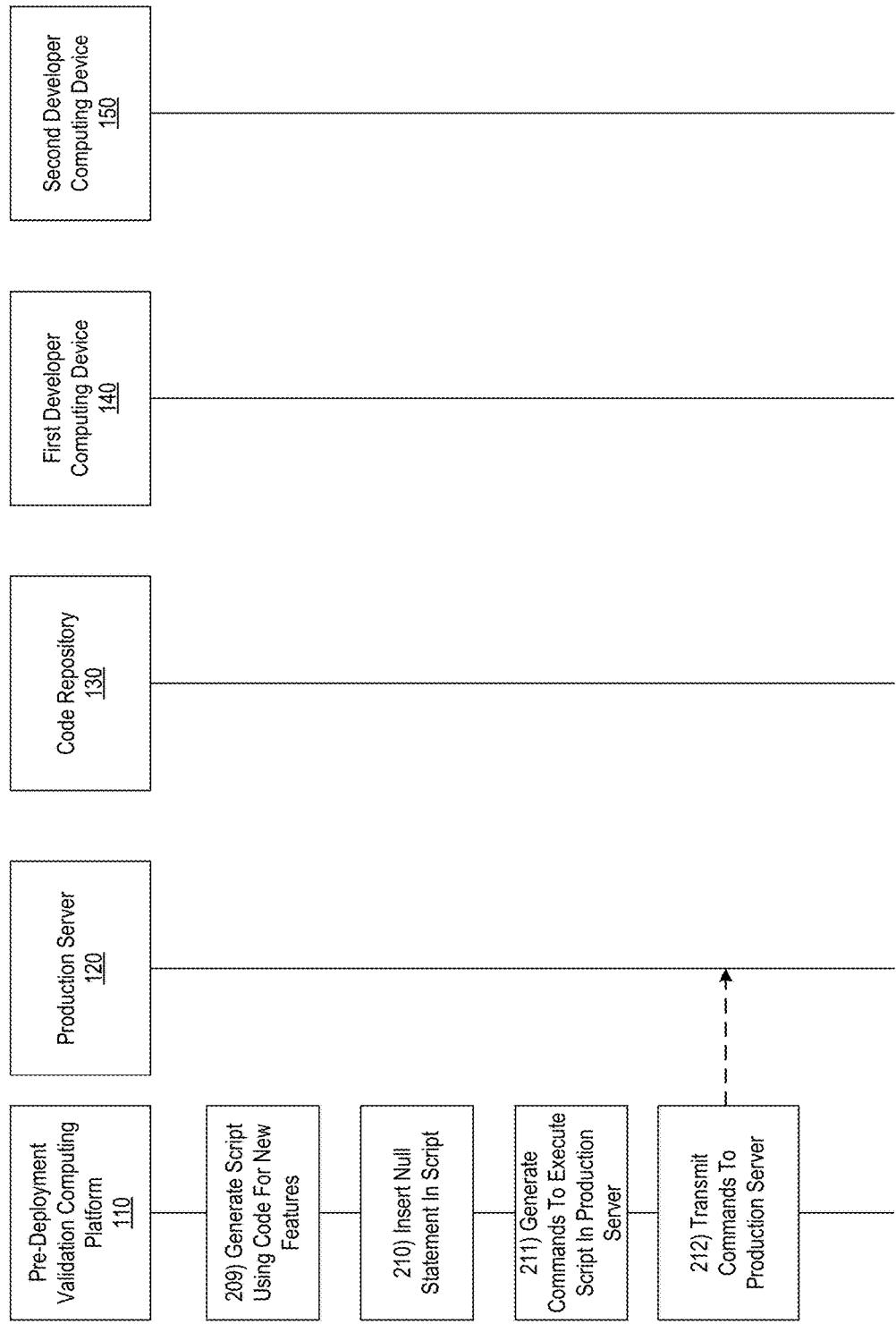

Referring to FIG. 2C, at step 209, the pre-deployment validation computing platform 110 may generate a script using code for the new features and/or updates. For example, after determining the code for the new features at step 208, the pre-deployment validation computing platform 110 may use the pre-deployment engine 117 to generate a script from the code for the new features and/or updates.

For instance, a developer for the enterprise organization may seek to test the code for the new features and/or updates. However, the new features and/or updates may execute correctly in a test environment or lab environment, but after being deployed in a production environment, the new features and/or updates may cause the application to crash. The production environment may be a live and/or real-time environment where the application is being executed and/or used by end users (e.g., clients of the enterprise organization). Thus, the pre-deployment validation computing platform 110 may generate a script to test the new feature and/or update in an isolated portion of the production environment. When generating the script, the pre-deployment validation computing platform 110 may include a portion of the code for the new features and/or updates. Furthermore, in some examples, the pre-deployment validation computing platform 110 may discard another portion of the code for the new features and/or updates.

FIG. 4 may show an example of a generated script 410. For example, the pre-deployment validation computing platform 110 may generate the script 410 from the code for the new feature 405. The pre-deployment validation computing platform 110 may copy, retrieve, and/or pull a portion of the code, such as a function (e.g., the function 415 corresponding to the procedure). The pre-deployment validation computing platform 110 may generate the script 410 from the copied, retrieved, and/or pulled portion of code. For example, the pre-deployment validation computing platform 110 may copy the code corresponding to the function 415 and may generate the script 410 comprising the function 415.

In some embodiments, since the generated script 410 may run and/or be executed in the production environment, the developer might not want to implement the new features and/or updates in the production environment. Therefore, the pre-deployment validation computing platform 110 may discard a portion of code, such as the create or replace package command, from the code for the new feature 405. Additionally, and/or alternatively, the pre-deployment validation computing platform 110 may create a new statement, such as a declare statement, in the generated script 410. Inside the declare statement, the pre-deployment validation computing platform 110 may insert the copied portion of code for the new features and/or updates (e.g., the function 415). Therefore, by defining and/or declaring the code corresponding to the function, the production server 120 may compile the code corresponding to the function 415 to determine errors, such as syntax and/or semantic errors. However, the production server 120 might not implement the function 415 in the production environment. By not implementing the function 415, the function 415 might not affect and/or modify the production environment.

In some instances, the code for the new feature 405 may include one or more functions. The pre-deployment validation computing platform 110 may generate the script 410 with a function from the code for the new feature 405. Additionally, and/or alternatively, the pre-deployment validation computing platform 110 may generate the script 410 with more than one function from the code for the new feature 405. Further, in some examples, the new features and/or updates may include one or more objects, such as one or more packages. The pre-deployment validation computing platform 110 may use one or more scripts for the one or more objects.

At step 210, the pre-deployment validation computing platform 110 may insert a null statement in the script. For example, after generating the script 410, the pre-deployment validation computing platform 110 may use the pre-deployment engine 117 to create and/or insert a null statement 420 in the generated script 410. The null statement 420 may cause the generated script 410 to not impact the application in the production environment. For instance, based on the null statement 420, when the generated script 410 is executed in the production environment, the generated script 410 might not cause a value to be returned.

In some examples, the pre-deployment validation computing platform 110 may insert the null statement 420 prior to retrieving, copying, and/or pulling the code for the new features and/or updates. Further, in other examples, the pre-deployment validation computing platform 110 may insert the null statement 420 after retrieving, copying, and/or pulling the code for the new features and/or updates.

At step 211, the pre-deployment validation computing platform 110 may generate one or more commands directing the production server 120 to run the script. For example, after generating the script at step 209 and/or inserting the null statement in the script at step 210, the pre-deployment validation computing platform 110 may use the pre-deployment engine 117 to generate one or more commands directing the production server 120 to run and/or execute the script (e.g., the generated script 410). As mentioned previously, the production server 120 may be configured to deploy and/or execute the application in a production environment, such as an environment where end users (e.g., clients of the enterprise organization) may use the application.

In some instances, the one or more commands may comprise one or more commands to determine whether the code includes errors, such as syntax and/or semantic errors. For example, the pre-deployment validation computing platform 110 may generate one or more commands directing the production server 120 to determine whether the code compiles correctly and/or determine whether the code (e.g., the function 415) includes any errors. Then, the one or more commands may cause the production server 120 to transmit the errors back to the pre-deployment validation computing platform 110.

At step 212, the pre-deployment validation computing platform 110 may transmit the one or more commands to the production server 120. For example, after generating the one or more commands at step 211, the pre-deployment validation computing platform 110 may use the pre-deployment engine 117 transmit the one or more commands to run and/or execute the script (e.g., the generated script 410) to the production server 120. The production server 120 may receive the one or more commands and/or execute the one or more commands. For example, the production server 120 may run the script (e.g., the generated script 410) in the production environment.

Figure 2D:
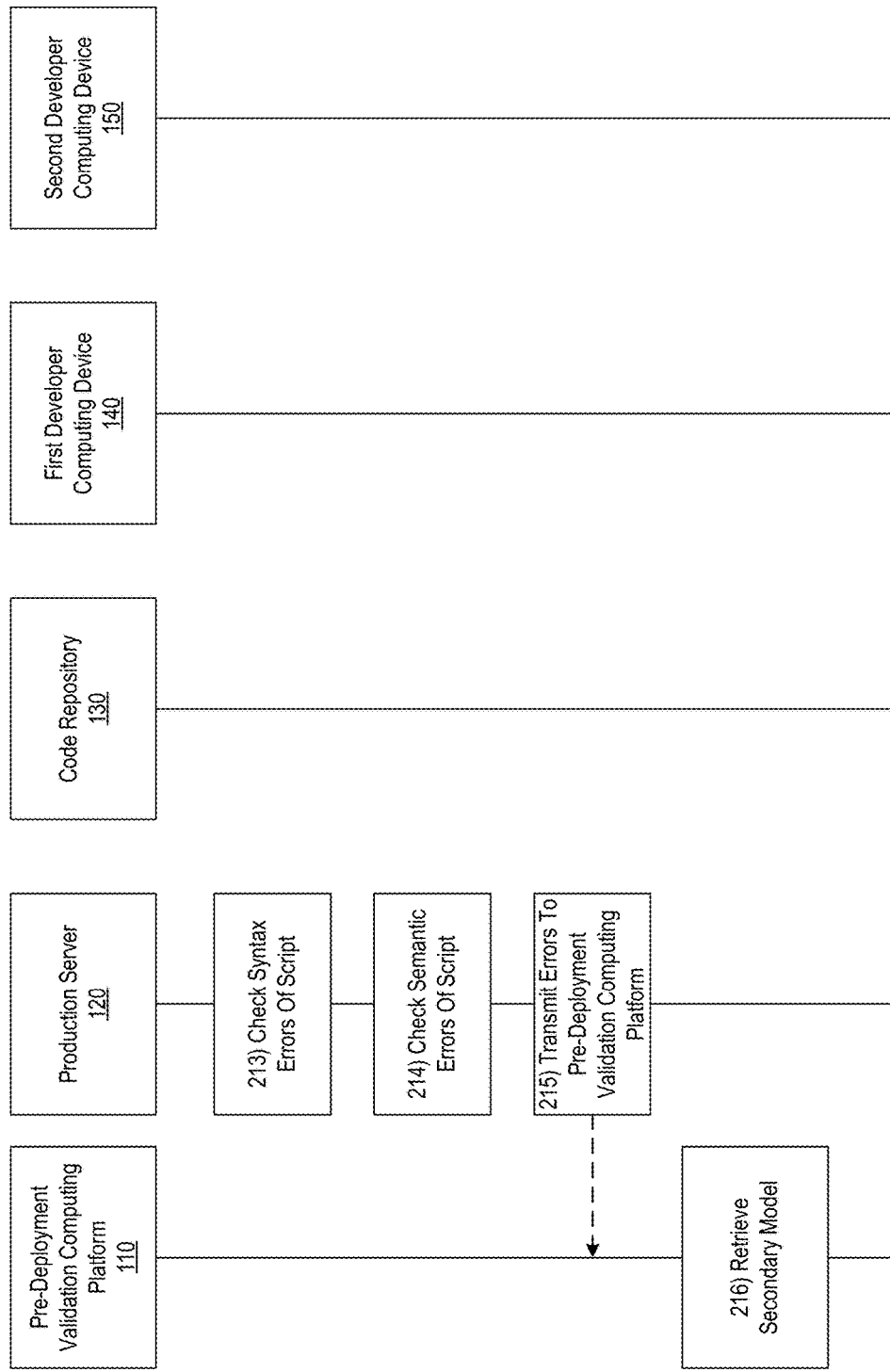

Referring to FIG. 2D, at step 213, the production server 120 may check for syntax errors in the script (e.g., the generated script 410). For example, the script may include one or more functions (e.g., the function 415) corresponding to the new features and/or updates for the application. After receiving the one or more commands, the production server 120 may execute the one or more commands. For instance, the production server 120 may run and/or execute the script. Then, the production server 120 may determine syntax errors in the script. By running and/or executing the script, the developer may determine whether the new features and/or updates comprise syntax errors when executed in the production environment.

At step 214, the production server 120 may check for semantic errors in the script (e.g., the generated script 410). For example, the script may include one or more functions (e.g., the function 415) corresponding to the new features and/or updates for the application. After receiving the one or more commands, the production server 120 may execute the one or more commands. For instance, the production server 120 may run and/or execute the script. Then, the production server 120 may determine semantic errors in the script. By running and/or executing the script, the developer may determine whether the new features and/or updates comprise semantic errors when executed in the production environment.

At step 215, the production server 120 may transmit the errors to the pre-deployment validation computing platform 110. For example, after checking for syntax errors and/or semantic errors in the script (e.g., the generated script 410), the production server 120 may transmit the errors to the pre-deployment validation computing platform 110. The pre-deployment validation computing platform 110 may receive the syntax and/or semantic errors.

At step 216, the pre-deployment validation computing platform 110 may retrieve the secondary model. Referring back to step 206, the pre-deployment validation computing platform 110 may populate the secondary model by processing objects from the primary model. The secondary model may include an object type field, an object name field, the key field, and/or a value field. The pre-deployment validation computing platform 110 may store the secondary model in the pre-deployment validation database 114. At step 216, the pre-deployment validation computing platform 110 may retrieve the secondary model from the pre-deployment validation database 114.

Figure 2E:
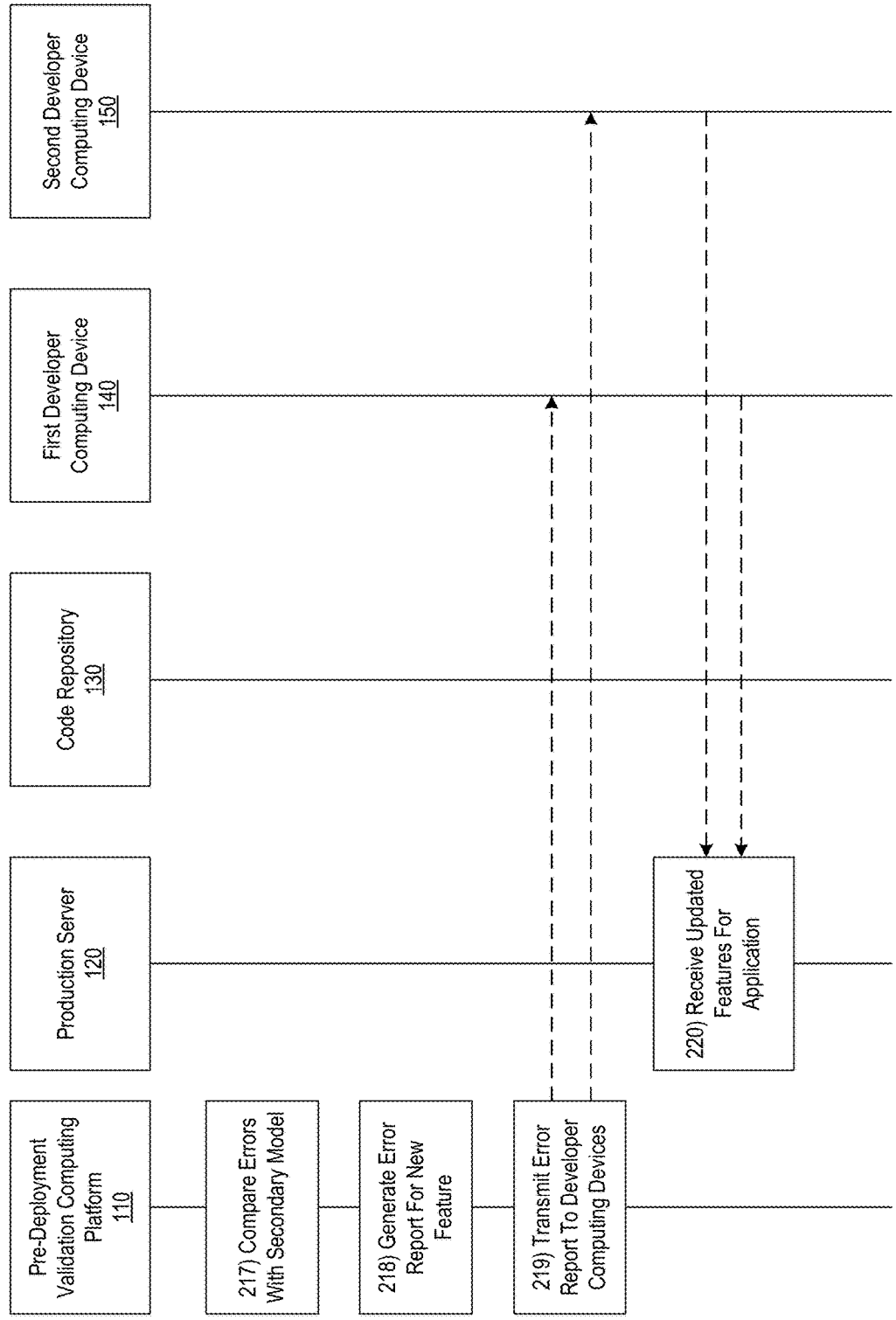

Referring to FIG. 2E, at step 217, the pre-deployment validation computing platform 110 may compare errors with the secondary model. For example, the pre-deployment validation computing platform 110 may compare the errors received from the production server 120 (e.g., the syntax and/or semantic errors from the generated script 410) with the secondary model (e.g., retrieved at step 216). As mentioned previously, the secondary model may indicate a future state of the application, such as a state that has already implemented the new features and/or updates in the application. The pre-deployment validation computing platform 110 may determine whether the errors from the script (e.g., the generated script 410) are actual errors or errors that may be resolved when the new features and/or updates are implemented in the application.

In some instances, the pre-deployment validation computing platform 110 may determine an error that may be resolved when the new features and/or updates are deployed in the application. For instance, the new features and/or updates may include two packages. The first package may be dependent on the second package being deployed. However, as mentioned previously, when generating the script (e.g., the generated script 410), the pre-deployment validation computing platform 110 may discard the create or replace package command and may only retrieve, copy, and/or pull the function from the package. Thus, the first package and/or the second package might not be created. Based on the first package being dependent on the second package being created, the production server 120 may determine an error and transmit the error back to the pre-deployment validation computing platform 110. However, as explained in further detail in FIG. 5 below, by comparing the secondary model with the error, the pre-deployment validation computing platform 110 may determine that the error may be resolved (e.g., the second package being created) when the new features and/or updates are deployed in the application.

At step 218, the pre-deployment validation computing platform 110 may generate an error report for the new features and/or updates. For example, based on the comparison between the errors with the secondary model at step 217, the pre-deployment validation computing platform 110 may generate an error report for the new features and/or updates. The error report may include the errors (e.g., the semantic and/or syntax errors in the generated script 410) received from the production server 120 (e.g., executed in the production environment). Further, the error report may include information indicating whether the errors are actual errors or errors that may be resolved when the new features and/or updates are deployed in the application.

FIG. 5 depicts an example graphical user interface for pre-deployment validation using intelligent databases. For example, FIG. 5 may show an example generated error report for the new features and/or updates. Referring to FIG. 5, the first row 505 may indicate a test package and an error with the test package. For example, the error may be a missing address column and/or field in the employee table. The pre-deployment validation computing platform 110, after receiving the error from the production server 120, may compare the missing address column error with the secondary model. Referring back to FIG. 3, the secondary model 310 might also not include the address field. Thus, the pre-deployment validation computing platform 110 may determine the missing address column and/or field in the employee table is an actual error.

The second row 510 may indicate a second package ("MS_IMS_USER_PKG") and an error with the second package. For example, the error may be that a dependent object is invalid (e.g., "TEST_PKG" has not been created). Thus, the pre-deployment validation computing platform 110 may compare the error with the secondary model and determine that the error will be resolved when the new features and/or updates are implemented in the application (e.g., when the test package has been created upon deployment). As mentioned previously, the secondary model 310 may indicate a model and/or simulation of the software application after the new features and/or updates have been implemented in the production environment. For example, the secondary model 310 may indicate a model and/or simulation of the software application after the "TEST_PKG" has been implemented in the production environment. The pre-deployment validation computing platform 110 may compare the dependent object is invalid error with the secondary model to determine whether after implementation of the new features and/or updates (e.g., "TEST_PKG"), the error has been resolved.

At step 219, the pre-deployment validation computing platform 110 may transmit the error report to developer computing devices. For example, after generating the error report in step 218, the pre-deployment validation computing platform 110 may transmit the error report to the first developer computing device 140 and/or the second developer computing device 150. Referring back to FIG. 5, the graphical user interface 500 may be a graphical user interface corresponding to the first developer computing device 140 and/or the second developer computing device 150.

In some embodiments, the developers may use the error report for the new features and/or updates to resolve the errors prior to deployment of the new features and/or updates in the production environment. For example, referring to the first row 505, the developers may add the missing address column and/or field in the employee table.

In some examples, the pre-deployment validation computing platform 110 may use machine learning engine 115 and the error reports to automatically resolve the errors in the new features and/or updates. For example, the pre-deployment validation computing platform 110 may use the error report to determine the errors, such as the missing address field. Then, the pre-deployment validation computing platform 110 may use the machine learning engine 115 to resolve the errors in the error report. For example, the pre-deployment validation computing platform 110 may add the missing address column and/or field in the new features and/or updates.

At step 220, the production server 120 may receive the updated features for the application. For example, the production server 120 may receive the updated features and/or updates for application from the first developer computing device 140 and/or the second developer computing device 150. In some instances, the pre-deployment validation computing platform 110 may determine errors in the new features and/or updates prior to deployment of the new features and/or updates. For example, after receiving the error reports, the developers may resolve the errors in the new features and/or updates. After resolving the errors, the developers, using the first developer computing device 140 and/or the second developer computing device 150, may transmit the updated features and/or updates for the application to the production server 120. The production server 120 may then deploy the updated features and/or updates for the application.

Figure 6:
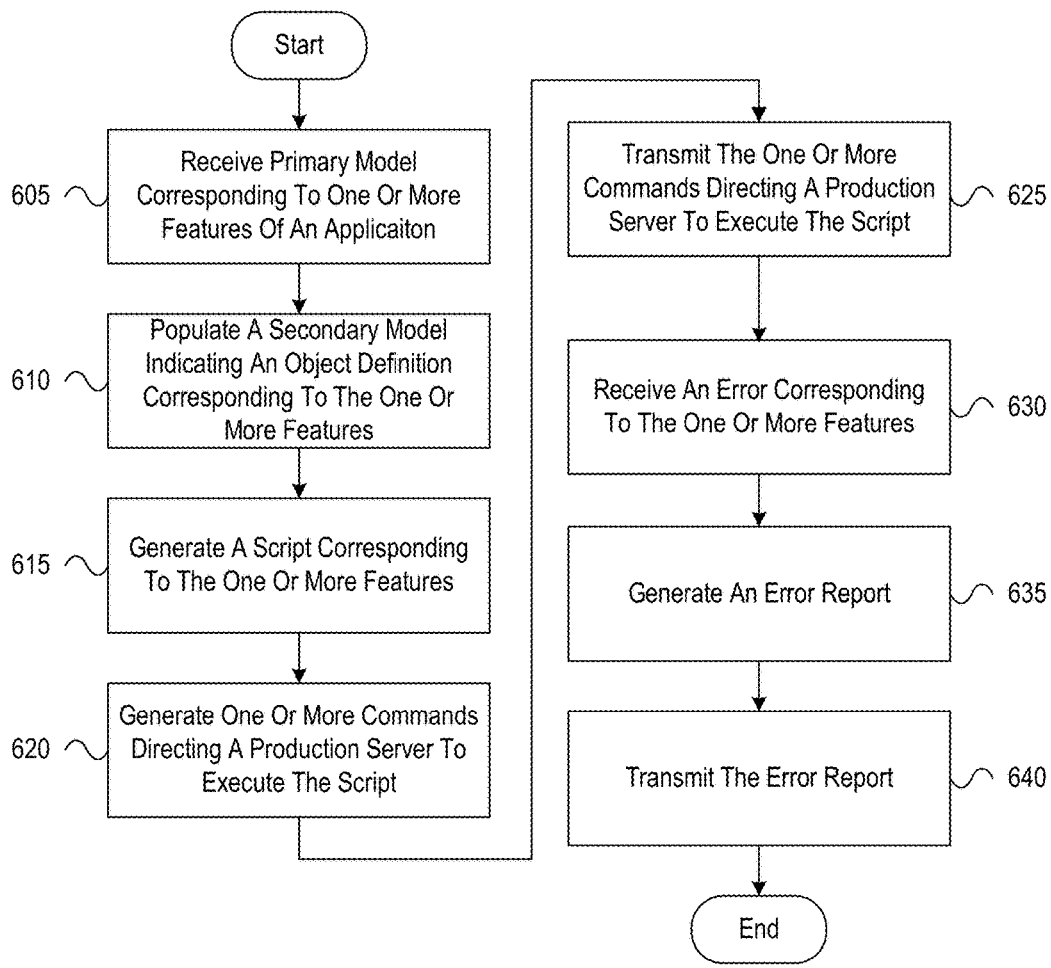
FIG. 6 depicts an illustrative method for pre-deployment validation using intelligent databases in accordance with one or more example embodiments.

FIG. 6 depicts an illustrative method for pre-deployment validation using intelligent databases in accordance with one or more example embodiments. Referring to FIG. 6, at step 605, a computing platform having at least one processor, a memory, and a communication interface may receive, via the communication interface and from a user device, a primary model corresponding to one or more features of an application. At step 610, the computing platform may populate, using a processing engine and based on the primary model, a secondary model indicating an object definition corresponding to the one or more features. At step 615, the computing platform may generate, using a pre-deployment engine and based on the primary model, a script corresponding to the one or more features. At step 620, the computing platform may generate one or more commands directing a production server to execute, in a production environment, the script corresponding to the one or more features. At step 625, the computing platform may transmit, to the production server and via the communication interface, the one or more commands directing the production server to execute the script. At step 630, the computing platform may receive, via the communication interface, from the production server, and based on the one or more commands, an error corresponding to the one or more features. At step 635, the computing platform may generate, based on comparing the error with the secondary model, an error report. At step 640, the computing platform may transmit, to the user device, the error report.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;

a communication interface communicatively coupled to the at least one processor; and memory storing computer-readable instructions that, when executed by the at least one processor, cause the computing platform to:

receive, via the communication interface and from a user device, a primary model corresponding to one or more features of an application;

populate, using a processing engine and based on the primary model, a secondary model indicating an object definition corresponding to the one or more features;

generate, using a pre-deployment engine and based on the primary model, a script corresponding to the one or more features;

generate one or more commands directing a production server to execute, in a production environment, the script corresponding to the one or more features;

transmit, to the production server and via the communication interface, the one or more commands directing the production server to execute the script;

receive, via the communication interface, from the production server, and based on the one or more commands, an error corresponding to the one or more features;

generate, based on comparing the error with the secondary model, an error report; and transmit, to the user device, the error report, wherein the generating of the script corresponding to the one or more features comprises:

determining, based on the primary model, a package of code corresponding to the one or more features; and generating, based on the package of code, the script, wherein the script comprises a function corresponding to the package of code, and wherein the script further comprises a null statement, and wherein the null statement blocks the package of code from being executed in the production environment.

2. The computing platform of claim 1, wherein the receiving of the primary model corresponding to the one or more features of the application comprises:

receiving, from the user device, a code base corresponding to the one or more features;

sorting, based on an object type, a plurality of objects corresponding to the one or more features; and generating, based on the sorting of the plurality of objects, the primary model.

3. The computing platform of claim 1, wherein the populating of the secondary model indicating the object definition comprises:

retrieving, from the primary model, an object corresponding to the one or more features;

determining, based on the object, the object definition; and generating, based on the object definition, the secondary model.

4. The computing platform of claim 3, wherein the object definition comprises an object type, an object name, and an object value.

5. The computing platform of claim 1, wherein the production environment comprises enterprise computing infrastructure configured to provide the application to a plurality of end users.

6. The computing platform of claim 1, wherein the transmitting of the one or more commands directing the production server to execute the script causes:

the production server to execute, in the production environment, the script to determine the error, wherein the error comprises a syntax error or a semantic error; and the production server to report, to the computing platform, the error.

7. The computing platform of claim 1, wherein the secondary model indicates a future state of the application comprising the one or more features, and wherein the generating of the error report comprises:

comparing the error with the secondary model indicating the future state of the application; and determining, based on the comparing of the error with the secondary model, whether the error is resolved by the future state of the application.

8. The computing platform of claim 1, wherein the memory stores additional computer-readable instructions that, when executed by the at least one processor, cause the computing platform to:

receive, via the communication interface and from a second user device, a second primary model corresponding to one or more features of a second application;

populate, using the processing engine and based on the second primary model, a second secondary model indicating a second object definition corresponding to the one or more features of the second application;

generate, using the pre-deployment engine and based on the second primary model, a second script corresponding to the one or more features of the second application;

generate one or more commands directing the production server to execute, in the production environment, the second script corresponding to the one or more features of the second application;

transmit, to the production server and via the communication interface, the one or more commands directing the production server to execute the second script;

receive, via the communication interface, from the production server, and based on the one or more commands, a second error corresponding to the one or more features of the second application;

generate, based on comparing the second error with the second secondary model, a second error report; and transmit, to the user device, the second error report.

9. A method, comprising:

at a computing platform comprising at least one processor, memory, and a communication interface:

receiving, by the at least one processor, via the communication interface, and from a user device, a primary model corresponding to one or more features of an application;

populating, by the at least one processor, using a processing engine, and based on the primary model, a secondary model indicating an object definition corresponding to the one or more features;

generating, by the at least one processor, using a pre-deployment engine, and based on the primary model, a script corresponding to the one or more features;

generating, by the at least one processor, one or more commands directing a production server to execute, in a production environment, the script corresponding to the one or more features;

transmitting, by the at least one processor, to the production server, and via the communication interface, the one or more commands directing the production server to execute the script;

receiving, by the at least one processor, via the communication interface, from the production server, and based on the one or more commands, an error corresponding to the one or more features;

generating, by the at least one processor and based on comparing the error with the secondary model, an error report; and transmitting, by the at least one processor to the user device, the error report, wherein the generating of the script corresponding to the one or more features comprises:
  determining, based on the primary model, a package of code corresponding to the one or more features; and
  generating, based on the package of code, the script, wherein the script comprises a function corresponding to the package of code, and wherein the script further comprises a null statement, and wherein the null statement blocks the package of code from being executed in the production environment.

10. The method of claim 9, wherein the receiving of the primary model corresponding to the one or more features of the application comprises:
  receiving, from the user device, a code base corresponding to the one or more features;
  sorting, based on an object type, a plurality of objects corresponding to the one or more features; and
  generating, based on the sorting of the plurality of objects, the primary model.

11. The method of claim 9, wherein the populating of the secondary model indicating the object definition comprises:
  retrieving, from the primary model, an object corresponding to the one or more features;
  determining, based on the object, the object definition; and
  generating, based on the object definition, the secondary model.

12. The method of claim 11, wherein the object definition comprises an object type, an object name, and an object value.

13. The method of claim 9, wherein the production environment is an environment where the application is deployed and executed by a plurality of end users.

14. The method of claim 9, wherein the transmitting of the one or more commands directing the production server to execute the script causes:
  the production server to execute, in the production environment, the script to determine the error, wherein the error comprises a syntax error or a semantic error; and
  the production server to report, to the computing platform, the error.

15. The method of claim 9, wherein the secondary model indicates a future state of the application comprising the one or more features, and wherein the generating of the error report comprises:
  comparing the error with the secondary model indicating the future state of the application; and
  determining, based on the comparing of the error with the secondary model, whether the error is resolved by the future state of the application.

16. One or more non-transitory computer-readable media storing instructions that, when executed by a computing platform comprising at least one processor, memory, and a communication interface, cause the computing platform to:
  receive, by the at least one processor, via the communication interface, and from a user device, a primary model corresponding to one or more features of an application;
  populate, using a processing engine and based on the primary model, a secondary model indicating an object definition corresponding to the one or more features;
  generate, using a pre-deployment engine and based on the primary model, a script corresponding to the one or more features;
  generate one or more commands directing a production server to execute, in a production environment, the script corresponding to the one or more features;
  transmit, to the production server and via the communication interface, the one or more commands directing the production server to execute the script;
  receive, via the communication interface, from the production server, and based on the one or more commands, an error corresponding to the one or more features;
  generate, based on comparing the error with the secondary model, an error report; and
  transmit, to the user device, the error report,
  wherein the generating of the script corresponding to the one or more features comprises:
    determining, based on the primary model, a package of code corresponding to the one or more features; and
    generating, based on the package of code, the script, wherein the script comprises a function corresponding to the package of code, and
  wherein the script further comprises a null statement, and wherein the null statement blocks the package of code from being executed in the production environment.

17. The one or more non-transitory computer-readable media of claim 16, wherein the receiving of the primary model corresponding to the one or more features of the application comprises:
  receiving, from the user device, a code base corresponding to the one or more features;
  sorting, based on an object type, a plurality of objects corresponding to the one or more features; and
  generating, based on the sorting of the plurality of objects, the primary model.

18. The one or more non-transitory computer-readable media of claim 16, wherein the populating of the secondary model indicating the object definition comprises:
  retrieving, from the primary model, an object corresponding to the one or more features;
  determining, based on the object, the object definition; and
  generating, based on the object definition, the secondary model.

19. The one or more non-transitory computer-readable media of claim 18, wherein the object definition comprises an object type, an object name, and an object value.

20. The one or more non-transitory computer-readable media of claim 16, wherein the production environment comprises enterprise computing infrastructure configured to provide the application to a plurality of end users.

* * * * *